(12) United States Patent
Xia et al.

(10) Patent No.: US 8,151,480 B2
(45) Date of Patent: Apr. 10, 2012

(54) CONTOUR MEASURING DEVICE FOR MEASURING ASPECTS OF OBJECTS

(75) Inventors: Fa-Ping Xia, Shenzhen (CN); Wei Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 321 days.

(21) Appl. No.: 12/646,850

(22) Filed: Dec. 23, 2009

(65) Prior Publication Data

US 2010/0205818 A1 Aug. 19, 2010

(30) Foreign Application Priority Data

Feb. 16, 2009 (CN) .......................... 2009 1 0300427

(51) Int. Cl.
*G01B 5/20* (2006.01)
(52) U.S. Cl. .......................................... 33/556; 33/551
(58) Field of Classification Search .................... 33/556, 33/551, 559, 503
See application file for complete search history.

(56) References Cited

U.S. PATENT DOCUMENTS

| | | | | |
|---|---|---|---|---|
| 5,515,615 A * | 5/1996 | Twigg et al. | ..................... | 33/551 |
| 6,536,121 B1 * | 3/2003 | Ishikawa et al. | ............... | 33/18.1 |
| 7,367,132 B2 * | 5/2008 | Mitsuhashi | ..................... | 33/556 |
| 7,913,412 B2 * | 3/2011 | Xia | ............................... | 33/559 |
| 7,997,000 B2 * | 8/2011 | Van Der Meijden et al. | ... | 33/645 |
| 2005/0022409 A1 | 2/2005 | Yamamoto et al. | | |
| 2010/0205818 A1 * | 8/2010 | Xia et al. | ........................ | 33/556 |
| 2011/0083334 A1 * | 4/2011 | Eley | ............................... | 33/503 |

FOREIGN PATENT DOCUMENTS

CN 101339083 1/2009

\* cited by examiner

*Primary Examiner* — Yaritza Guadalupe-McCall
(74) *Attorney, Agent, or Firm* — Altis Law Group, Inc.

(57) ABSTRACT

A contour measuring device includes a guide rail, a slidable assembly, and a measuring probe. The slidable assembly is slidably engaged with the guide rail. The slidable assembly includes a weight adjusting unit connected to the slidable assembly. At least part of the weight adjusting unit is detachable from the slidable assembly. The measuring probe is fixed on the slidable assembly. A weight of the slidable assembly provides a measuring force and a weight of the weight adjusting unit is adjustable to adjust a value of the measuring force.

17 Claims, 3 Drawing Sheets

CONTOUR MEASURING DEVICE FOR MEASURING ASPECTS OF OBJECTS

BACKGROUND

1. Technical Field

The present invention relates generally to contour measuring devices for coordinate measuring machines (CMMs); and more particularly to a contact-type contour measuring device with a relatively steady measuring force.

2. Description of Related Art

Manufactured precision objects such as optical components (for example, aspherical lenses) and various industrial components need to be measured to determine whether manufacturing errors of the objects are within acceptable tolerance. Manufacturing errors are the differences between design dimensions of the object and actual dimensions of the manufactured object. Precision measuring devices are used to measure the objects. Generally, the precision objects are measured with a coordinate measuring machine (CMM), which has a touch trigger probe that contacts the objects. A measuring force applied to the touch trigger probe of the CMM should be steady. If the measuring force is not steady, a relatively large measuring error may occur.

A typical method to reduce a measuring force on the touch trigger probe is to configure the touch trigger probe with a spring. An elastic force of the spring is regarded as a measuring force. However, when the contact tip moves along the surface of the object being measured, vibrations of the movement may cause the spring to resonate and deform. The measuring force varies with the deformation of the spring, and subject to errors in the measurement results.

Another probe uses an air pump to provide a measuring force. However, the air pump cannot provide a steady measuring force because the air pump provides pulsed pressure.

Therefore, a new contour measuring device is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
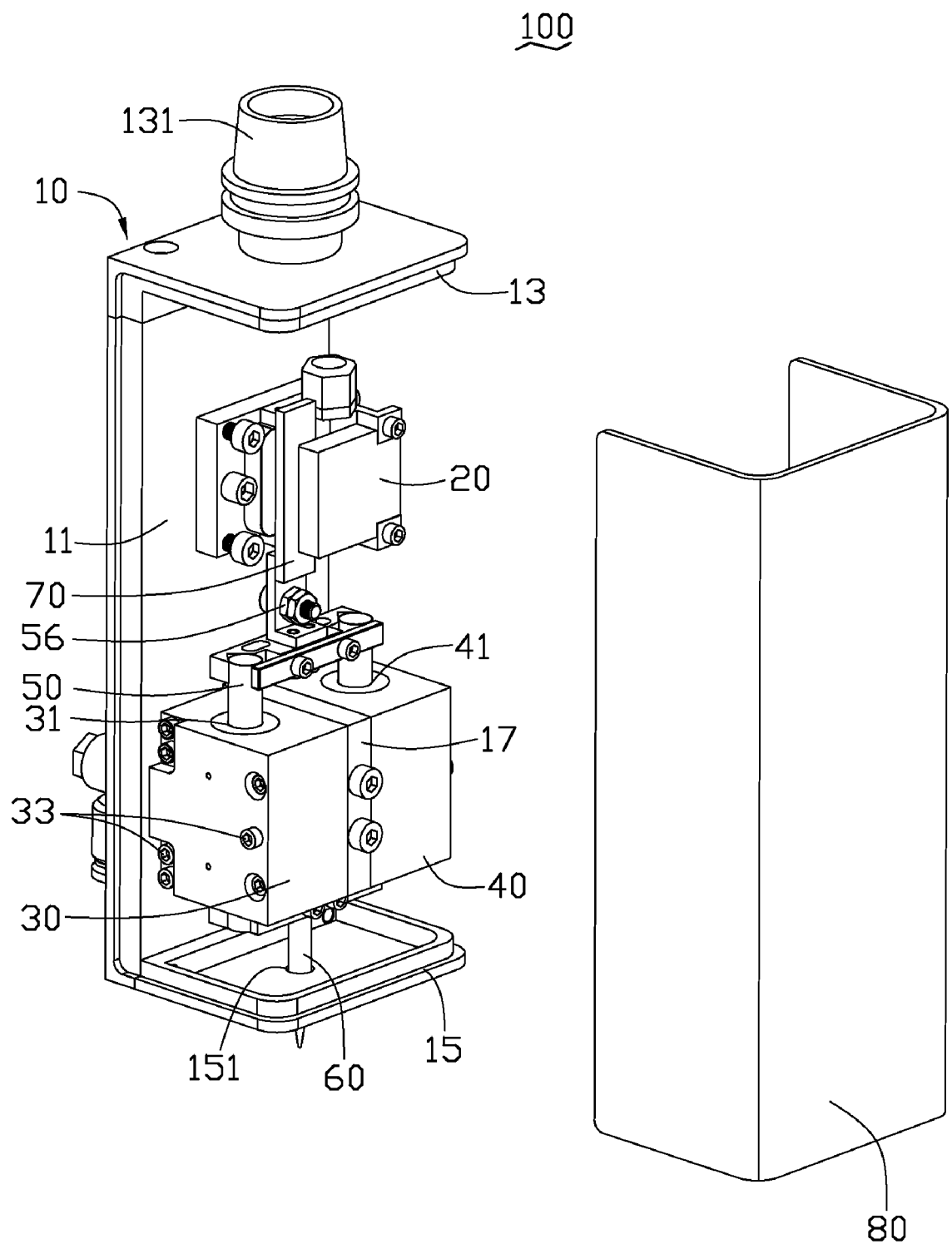
FIG. 1 is an exploded, perspective view of one embodiment of a contour measuring device having a slidable assembly.

Referring to FIG. 1, one embodiment of a contour measuring device 100 includes a bracket 10, a sensor 20 mounted on the bracket 10, a first guide rail 30, a second guide rail 40, a slidable assembly 50 slidably mounted to the guide rails 30, 40, a measuring probe 60, a linear measuring scale 70, and a housing 80.

The bracket 10 includes a base wall 11, a top wall 13, a bottom wall 15, and an extending wall 17. The top wall 13 and the bottom wall 15 are formed at opposite ends of the base wall 11. The extending wall 17 is formed at a middle portion of the base wall 11, and between the top wall 13 and the bottom wall 15. The top wall 13 forms a connecting portion 131 extending towards a direction opposite to the bottom wall 15. The bottom wall 15 defines a through hole 151 to receive the measuring probe 60. The extending wall 17 is substantially perpendicular to the base wall 11 and the bottom wall 15, and adjacent to the bottom wall 15.

The sensor 20 is fixed on the base wall 11, and adjacent to the top wall 13. The sensor 20 is to sense displacements of the linear measuring scale 70 when moving together with the measuring probe 60, thereby getting a displayed value of the linear measuring scale 70 by comparing the displacements with an original value of the liner measuring scale 70. The sensor 20 is generally connected to a controller which can manage the values of the sensor 20.

The first guide rail 30 and the second guide rail 40 can be air guide rails. The first guide rail 30 and the second guide rail 40 are fixed on opposite sides of the extending wall 17 and have substantially the same structure. The first guide rail 30 defines a guiding slot 31 and the second guide rail 40 defines a guiding slot 41 substantially parallel to the guiding slot 31. However, the weight of the first guide rail 30 and the second guide rail 40 are not likely to be exactly the same. To compensate for the difference in weight, adjusting members 33 may be mounted on the first guide rail 30 and the second guide rail 40. In the illustrated embodiment, the adjusting member 33 is a bolt positioned outside the first guide rail 30 or the second guide rail 40. In the illustrated embodiment, the first guide rail 30 and the second guide rail 40 are vertically arranged. Thus, two sides of the extending wall 17 experience the same forces because the first guide rail 30 and the second guide rail 40 have substantially the same weight.

Figure 2:
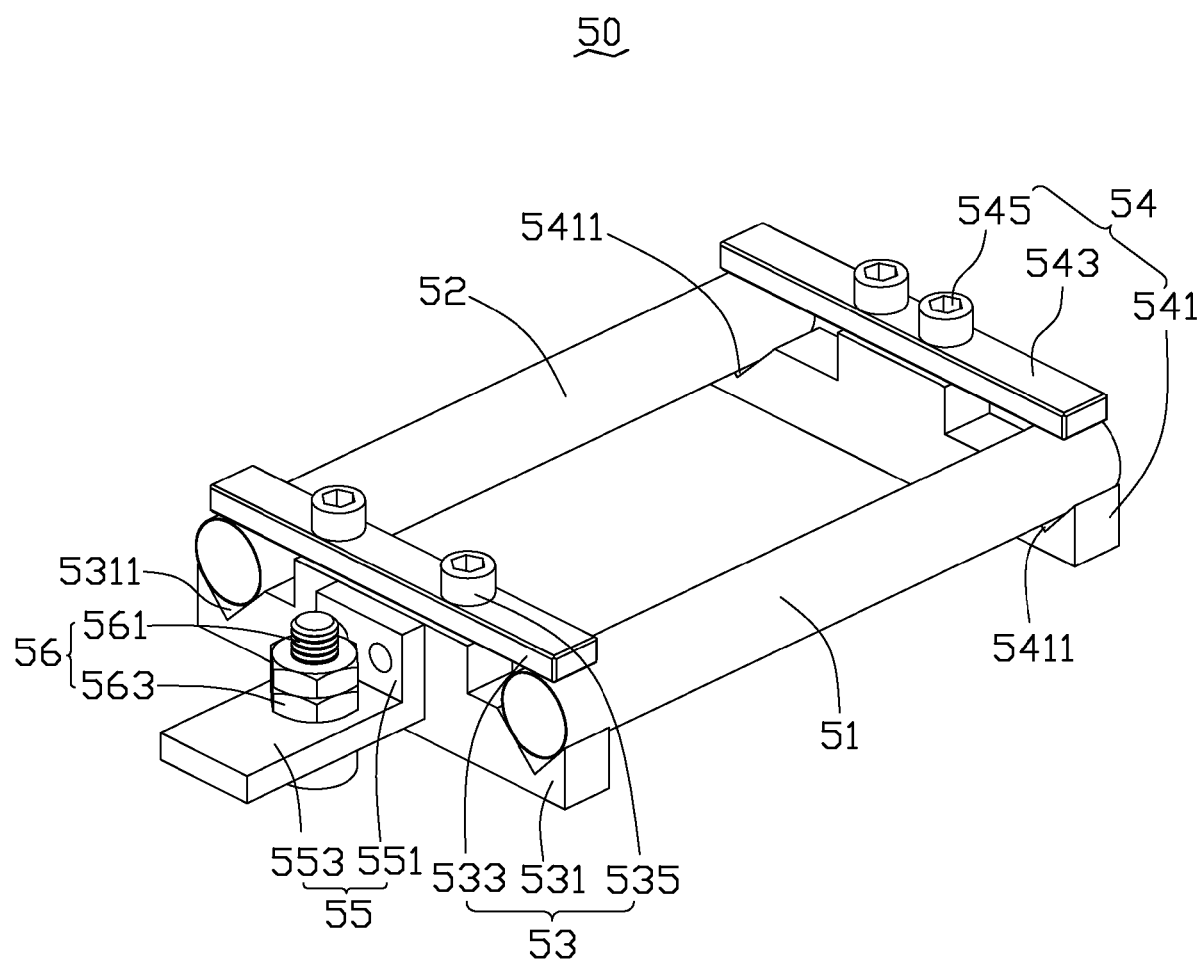
FIG. 2 is a perspective view of the slidable assembly of the contour measuring device of FIG. 1.

Referring to FIG. 2, the slidable assembly 50 includes a first leading pole 51, a second leading pole 52, a first connecting member 53, a second connecting member 54, a fixing member 55, and a weight adjusting unit 56. The slidable assembly 50 has an axisymmetric structure.

The first leading pole 51 is substantially cylindrical and running through the guiding slot 31. One end of the first leading pole 51 is fixed to the first connecting member 53 and the other end of the first leading pole 51 is fixed to the second connecting member 54. The first leading pole 51 can be a hollow tube to lighten the first leading pole 51. The second leading pole 52 is substantially cylindrical, running through the guiding slot 41, and positioned substantially parallel to the first leading pole 51. Opposite ends of the second leading pole 52 are fixed to the first connecting member 53 and the second connecting member 54. The second leading pole 52 can also be a hollow tube. Coaxiality between the axis of the first leading pole 51 and the guiding slot 31 of the first guide rail 30 are substantially coaxial, and the second leading pole 53 and the guiding slot 41 of the second guide rail 40 are substantially coaxial. Thus, the slidable assembly 50 is slidable along a vertical direction, i.e., a direction of the weight of the slidable assembly 50.

The first connecting member 53 includes a main body 531, a blocking sheet 533, and at least one fastening member 535. The main body 531 defines two engaging slots 5311. In the illustrated embodiment, the engaging slots 5311 are V-shaped. One end of each of the first leading pole 51 and the second leading pole 52 is partially received in one engaging slot 5311. The blocking sheet 533 is fixed to the main body 531 by the fastening member 535, thus holding the first leading pole 51 and the second leading pole 52 on the first connecting member 53.

The second connecting member 54 includes a main body 541, a blocking sheet 543, and at least one fastening member 545 and has a structure similar to the first connecting member 53. The main body 541 defines two engaging slots 5411 for partially receiving the other ends of the first leading pole 51 and the second leading pole 52. In the illustrated embodiment, the engaging slots 5411 are V-shaped. The blocking sheet 543 is fixed to the main body 541 by the fastening member 545.

The fixing member 55 includes a first connecting wing 551 and a second connecting wing 553 formed substantially perpendicular from an end of the first connecting wing 551. The first connecting wing 551 is fixed to the first connecting member 53.

The weight adjusting unit 56 is detachably connected to the second connecting wing 553 of the fixing member 55. Alternatively, the weight adjusting unit 56 may be connected to other components of the slidable assembly 50. The weight adjusting unit 56 includes a bolt 561 and at least one nut 563 screwed on the bolt 561. Nuts 563 having various weights are engagable with the bolt 561 to adjust the weight of the weight adjusting unit 56.

The measuring probe 60 is fixed on a center of the second connecting member 54. An end of the measuring probe 60 extends to an outside of the contour measuring device 100 to contact a surface of an object to be measured.

The linear measuring scale 70 is fixed on the second connecting wing 553 of the fixing member 55 and corresponds to the sensor 20. The linear measuring scale 70 may be fixed via adhesive or screwing methods. In the illustrated embodiment the linear measuring scale 70 is fixed by pasting to lighten the slidable assembly 50.

The housing 80 is coupled to the bracket 10 to seal other components inside the housing 80 and the bracket 10. Therefore, the components can be protected from dust and moist.

In use, the weight of the weight adjusting unit 56 is adjusted to adjust a measuring force to a proper value according to requirement of different objects to be measured. Then air or other gas is injected in the first guide rail 30 and the second guide rail 40 so that there is small or even no friction between the first guide rail 30 and the first leading pole 51 and between the second guide rail 40 and the second leading pole 52 when the first and second leading poles 51, 52 slide in the first and second guide rails 30, 40 respectively.

The measuring probe 60 will not shake because a weight of the slidable assembly 50 acts as the measuring force. In addition, the measuring force can be changed to a required value by applying different nuts 563.

In alternative embodiments, the slidable assembly 50 may include two or more weight adjusting units 56. The first and second leading poles 51, 52 of the slidable assembly 50 can be vertically arranged so as to reduce or eliminate friction with the first and second guide rails 30, 40. The weight adjusting units 56 may be other members such as counterweight, other than a bolt or screw. The weight adjusting unit 56 may only include the nut 563 mounted on the fixing member 55 via magnetism, for example. The contour measuring device 100 may also include a single guide rail or more than two guide rails. Accordingly, the slidable assembly 50 may include a single leading pole or more than two leading poles. The guiding slots 31, 41 may also be defined in a same guide rail. Positions of the sensor 20 and the linear measuring scale 70 may be exchanged so long as the sensor 20 or the linear measuring scale 70 slides along with the slidable assembly 50.

Figure 3:
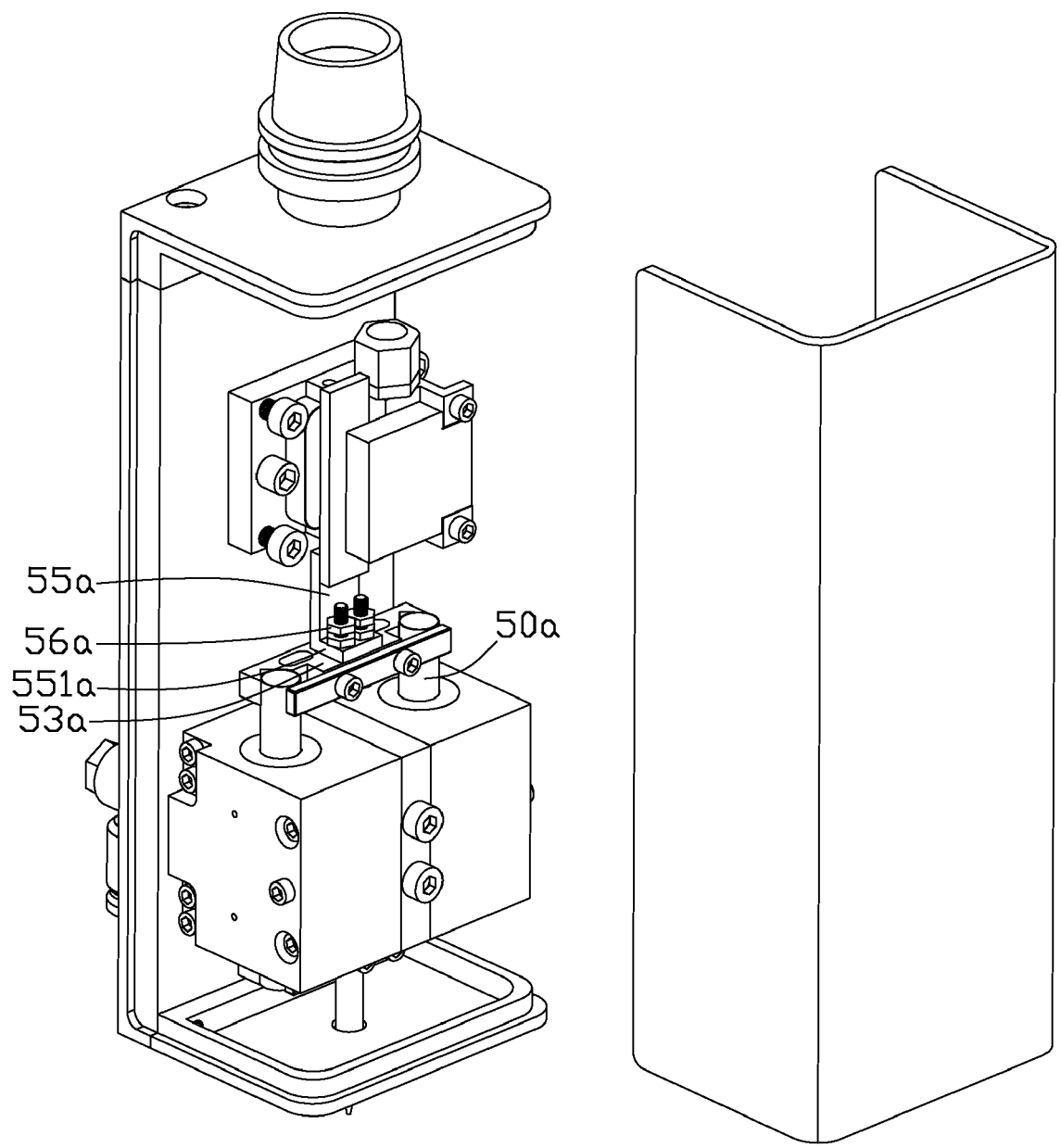
FIG. 3 is an exploded, perspective view of another embodiment of a contour measuring device.

Referring to FIG. 3, another embodiment of a contour measuring device 200 is similar to the contour measuring device 100, except that a slidable assembly 50a includes a fixing member 55a, a first connecting member 53a, two leading poles (not labeled), and a weight adjusting unit 56a. The weight adjusting unit 56a is mounted on a first connecting wing 551a of the fixing member 55a and connects the fixing member 55a with the first connecting member 53a.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A contour measuring device, comprising:
a guide rail;
a slidable assembly slidably engaging with the guide rail, the slidable assembly comprising a weight adjusting unit connected to the slidable assembly; and
a measuring probe fixed on the slidable assembly;
wherein at least part of the weight adjusting unit is detachable from the slidable assembly, a weight of the slidable assembly provides a measuring force and a weight of the weight adjusting unit is changeable to adjust the measuring force.

2. The contour measuring device of claim 1, wherein the weight adjusting unit comprises a bolt and a nut.

3. The contour measuring device of claim 1 further comprising a sensor and a linear measuring scale positioned corresponding to the sensor, wherein one of the sensor and the linear measuring scale is fixed on the slidable assembly, and the other one of the sensor and the linear measuring scale is fixed to the guide rail.

4. The contour measuring device of claim 3 further comprising a bracket, the bracket comprising a base wall, a top wall, a bottom wall, and an extending wall, the extending wall being substantially perpendicular to the base wall and the bottom wall, wherein the sensor is mounted on the bracket; the guide rail comprises a first guide rail and a second guide rail, the first and second guide rails being fixed on opposite sides of the extending wall.

5. The contour measuring device of claim 4, wherein each of the first guide rail and the second guide rail defines a guiding slot; the slidable assembly comprises a first leading pole and a second leading pole, the first leading pole and the second leading pole running through the guiding slots of the first and second guide rails, respectively.

6. The contour measuring device of claim 5, wherein the slidable assembly further comprises a first connecting member defining two engaging slots, a second connecting member defining two engaging slots, and a fixing member; ends of the first leading pole and the second leading pole are partially received in the engaging slots of the first connecting member and the second connecting member, respectively; the first leading pole and the second leading pole are fixed to the first connecting member and the second connecting member, respectively.

7. The contour measuring device of claim 6, wherein the engaging slots are V-shaped.

8. The contour measuring device of claim 6, wherein an adjusting member is mounted on at least one of the first guide rail and the second guide rail.

9. The contour measuring device of claim 6 further comprising a housing coupled with the bracket to seal the sensor, the first guide rail, the second guide rail, the slidable assembly, and part of the measuring probe inside the housing and the bracket.

10. The contour measuring device of claim 1, wherein the guide rail is an air rail.

11. A contour measuring device comprising:
a guide rail vertically positioned;

a slidable assembly being slidable along with the guide rail, the slidable assembly comprising a weight adjusting unit; and a measuring probe fixed on the slidable assembly, the measuring probe pointing a direction of a weight of the slidable assembly;

wherein at least part of the weight adjusting unit is detachable from the slidable assembly, the weight adjusting unit comprises a plurality of counterweights with different weights, one or more counterweight being detachably connected to the slidable assembly.

12. The contour measuring device of claim 11 further comprising a sensor and a linear measuring scale positioned corresponding to the sensor, wherein one of the sensor and the linear measuring scale is fixed on the slidable assembly, and the other one of the sensor and the linear measuring scale is fixed to the guide rail.

13. The contour measuring device of claim 12 further comprising a bracket, the bracket comprises a base wall, a top wall, a bottom wall, and an extending wall, the extending wall being substantially perpendicular to the base wall and the bottom wall; the sensor is mounted on the bracket; the guide rail comprises a first guide rail and a second guide rail, the first and second guide rails being fixed on opposite sides of the extending wall.

14. The contour measuring device of claim 13, wherein each of the first guide rail and the second guide rail defines a guiding slot; the slidable assembly comprises a first leading pole and a second leading pole, the first leading pole and the second leading pole running through the guiding slots of the first and second guide rails, respectively.

15. The contour measuring device of claim 14, wherein the slidable assembly further comprises a first connecting member defining two engaging slots, a second connecting member defining two engaging slots, and a fixing member; ends of the first leading pole and the second leading pole are partially received in the engaging slots of the first connecting member and the second connecting member, respectively; the first leading pole and the second leading pole are fixed to the first connecting member and the second connecting member, respectively.

16. The contour measuring device of claim 15, wherein an adjusting member is mounted on at least one of the first guide rail and the second guide rail.

17. The contour measuring device of claim 16 further comprising a housing coupled with the bracket to seal the sensor, the first guide rail, the second guide rail, the slidable assembly and part of the measuring probe inside the housing and the bracket.

* * * * *